Feb. 27, 1973   A. W. BIDWELL   3,718,573
FLUID FITTING

Filed Nov. 8, 1971   2 Sheets-Sheet 1

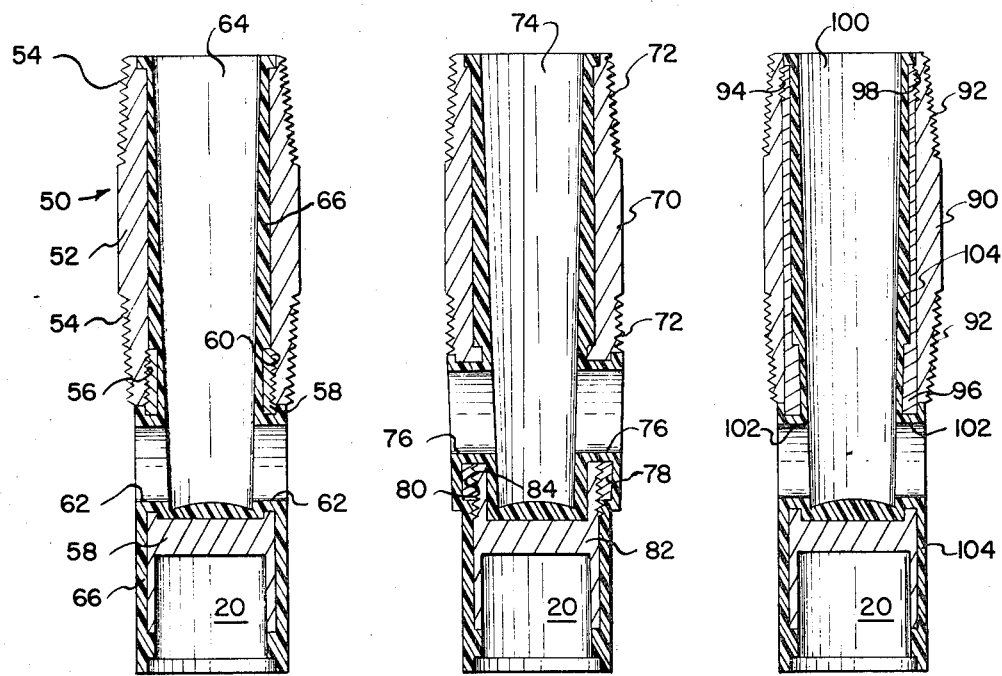

United States Patent Office 3,718,573
Patented Feb. 27, 1973

3,718,573
FLUID FITTING
Arthur W. Bidwell, Middletown, Ohio, assignor to
Magnode Products, Inc., Trenton, Ohio
Filed Nov. 8, 1971, Ser. No. 196,367
Int. Cl. C23b 5/70
U.S. Cl. 204—297 R                           17 Claims

ABSTRACT OF THE DISCLOSURE

A fitting for fluid systems and the like comprising a body member having an annular wall and having means on the outside surface thereof for securing the body member to a support member, the body member being tubular and having opened upper and lower ends, and having an annular baffle spaced from the ends and dividing the body member into two separate chambers. The body member includes a pair of diametrically opposed openings in the wall adjacent the baffle opening into one of the chambers, the other of the chambers forming a socket. The securing means is positioned above the wall opening. Also, the one of the chambers, the wall openings, the outside wall of the body member from the wall opening downwardly to beyond the lower end thereof, and the lower end of the wall member are covered with a plastic insulating coating.

CROSS REFERENCE TO RELATED APPLICATION

This application is a continuation-in-part of my copending application Ser. No. 158,431, filed June 30, 1971, for "Anode Fitting."

This invention relates to a pipe fitting and more particularly to a fitting for fluid systems and the like for introducing a fluid into a receptacle.

The large variety of fluid fittings for plumbing installations and the like are presently available on the market. Such fittings serve as connections, elbows, tees, and inlet fittings. Generally, such fittings are designed for a single specific use, or for use with a single specific fluid.

In receptacles such as water tanks, hot water heaters, fuel tanks, and the like, a fitting must be provided which may have a fluid tight seal with the receptacle, and which will not be subject to corrosive action due to the fluid contained therein. This is particularly so in the case of receptacles for containing liquids which are electrolytes and which may serve to promote a galvanic corrosion of the parts.

The prior art is replete with fluid fittings containing electrodes therein to serve as scarificial elements for corrosition protection. However, such devices, by their nature, are somewhat expensive.

Therefore, it is an object of this invention to provide a fluid fitting which overcomes the disadvantages of prior art fittings.

Another object of this invention is to provide a fluid inlet fitting for fluid containing receptacles.

A further object of this invention is to provide a fluid inlet fitting which is protected from corrosive action of the fluid passing therethrough.

Still a further object of this invention is to provide a fluid fitting which may be used with a scarifiial electrode if desired.

Yet a further object of this invention is to provide a fluid fitting having a socket into which a member may be inserted and retained.

Yet another object of this invention is to provide a fluid inlet fitting having a protective coating thereon.

These and other objects and advantages of this invention will become apparent when considered in light of the following description and claims when taken together with the drawings in which:

FIG. 5 is a longitudinal sectional view similar to FIG. 1 showing an alternative embodiment of the fitting of this invention;

FIG. 6 is a longitudinal sectional view similar to FIG. 1 and showing still another alternative embodiment of this invention; and FIG. 7 is a longitudinal secitonal view similar to FIG. 1 and showing still a further alternative embodiment of this invention.

Figure 1:
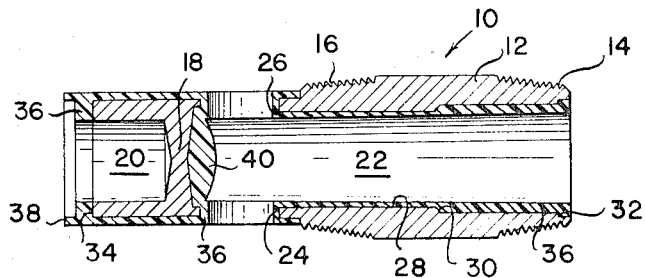
FIG. 1 is a longitudinal sectional view along lines 1—1 of FIG. 2 and viewed in the direction of the arrows.
Figure 2:
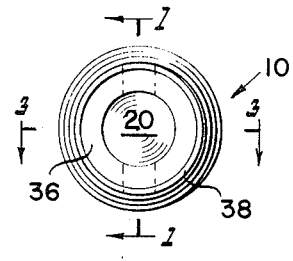
FIG. 2 is an end elevation of the fitting of FIG. 1 as seen from the left end thereof.
Figure 3:
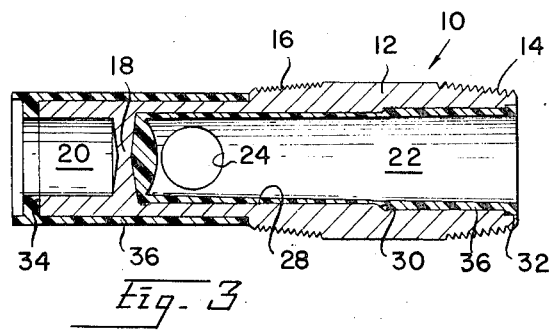
FIG. 3 is a longitudinal sectional view along lines 3—3 of FIG. 2 and viewed in the direciton of the arrows.

Referring now to FIG. 1, the fitting generally designated 10 is seen to include a tubular body member 12 having threaded portions 14 and 16. Threaded portions 14 and 16 serve to secure the fitting of this invention to a receptacle such as a water tank or the like through conventional threaded connections (not shown). The body member 12 is seen to have an internal annular baffle 18 which divides the body member 12 into chambers 20 and 22. As best seen in FIGS. 1 and 3, the baffle is preferably concave toward the chambers 20 and 22.

Opening into chamber 22 are a pair of openings 24 and 26 formed in the body member 12. The internal wall 28 of chamber 22 is seen to be provided with shoulders 30 and 32. The interior wall of 28 of chamber 22, openings 24 and 26, the exterior surface of body member 12 below the threaded portions 14 and 16, and the end 34 of the body member 12 are coated with a suitable insulating protective coating 36. Coating 36 is continuous and homogeneous from the inside of the body member 12 to the outside thereof. That is, the portion of the coating on the outside is connected to the portion of the coating within chamber 22 by the portion of the coating covering the openings 24 and 26. The insulating, protective coating 36 is preferably of a synthetic resin such as polypropylene, polyethylene, polysulfones or the like. However, other thermosetting or thermoplastic resins capable of being coated onto the surface of the body member and being inert to fluids passing through the fitting could be utilized.

When the fitting is used in installations which are subject to a galvanic type of corrosion, such as in some water receptacles, a sacrificial electrode (not shown) may be inserted into the chamber or socket 20 of the body member 12, and held thereby suitable means such as frictional contact. In this manner, the electrode makes electrical contact with the baffle 18 for the protection of the receptacle and the fitting against corrosion.

If desired, the interior of the chamber 20 may be coated with the same material used for the coating 36 on the remainder of the fitting.

The coating 36 is seen to include an annular depending flange portion 38 which serves to assist in position an electrode in the socket 20 if the electrode is utilized.

The portion 40 of the coating 36 is preferably formed so as to have a convex configuration toward the chamber 22 as seen in FIGS. 1 and 3. This domed portion 40 serves to prevent collection of sediment within the chamber 22. Additionally, the interior wall of the chamber 22 is tapered inwardly from the outermost end toward the baffle. This taper, together with the dome 40, permits ready removal of the core utilized in the manufacture of the device if the coating is molded to the interior of the body member 12.

Figure 4:
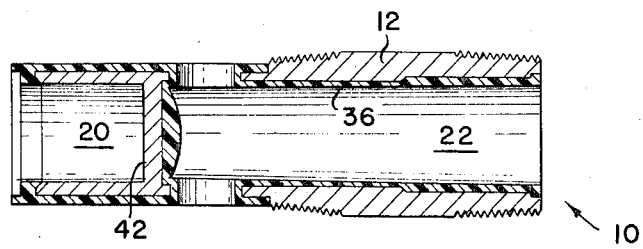
FIG. 4 is a longitudinal sectional view similar to FIG. 1 showing an alternate embodiment of the fitting of this invention.

Referring now to FIG. 4, an alternate embodiment of this invention is shown wherein a baffle 42 is seen to have substantially flat surfaces facing the chambers 20 and 22 instead of the concave configurations of FIGS. 1 and 3. This configuration may be desired in some applications of the fitting of this invention however, the portion 44 of the coating 36 is also convex toward the chamber 22 for the same reasons as outlined with respect to the embodiment of FIG. 1.

An alternate embodiment of the fitting of this invention is shown in FIG. 5. The fitting generally designated 50 is seen to include a nipple 52 which is externally threaded as at 54 and internally threaded as shown at 56.

An extension member 58 includes an upstanding threaded portion 60 which threadedly engages threads 56 on nipple 52. The extension member 58 includes a fluid passageway 62, and nipple 52 includes a fluid passageway 64. As in the embodiments previously described, fluid passageways 62 and 64 are lined with an insulating coating material 66.

FIG. 6 discloses another alternate embodiment of this invention wherein a nipple member 70 is provided with external threads 72 and with a longitudinal fluid passageway 74 and transverse passageways 76. A depending socket portion 78 of nipple 72 is internally threaded as at 80. An extension member 82 which is threaded as at 84 engages threads 80 of socket portion 78. Passageways 74 and 76 as well as extension member 82 are coated with an insulation coating shown at 86.

Referring now to FIG. 7, still another alternate embodiment of this invention is shown and includes a nipple 90 which is externally threaded as at 92 and internally threaded at its upper portion as designated 94. An internal extension member 96 having external threads 98 is threadedly engaged with threads 94 of nipple 90. Extension member 96 is provided with a longitudinal fluid passageway 100 and transverse fluid passageways 102. As in the previous embodiments, fluid passageways 100 and 102 as well as the lower portion of extension member 96 are coated with an insulating coating 104.

The embodiment shown in FIGS. 5–7 are particularly important where certain specifications may call for a nipple being made of brass or copper while the cost of brass or copper prohibits its use for the entire fitting. In this manner, the extension members may be made of steel, and no effectiveness of the fitting will be lost. Yet, the overall cost is less expensive then if the entire metallic portion of the fitting were made of brass or copper.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A fitting for fluid systems and the like comprising:
   (a) a tubular body member having thread means on the outside surface thereof for securing said fitting to a support member,
   (b) said body member having a baffle therein dividing said body member into a fluid passageway chamber and a socket,
   (c) said fluid passageway chamber and said socket having open distal ends,
   (d) said body member having an opening adjacent said baffle into said fluid passageway chamber,
   (e) the wall of said fluid passageway chamber being non-tapering and including at least one annular stepped portion positioned so that the portion having the greater diameter is nearest said fluid passageway chamber distal end, and the portion having the lesser diameter is nearest said baffle,
   (f) a plastic insulating coating covering the walls of said fluid passageway chamber and said opening, the outside wall of said body member from adjacent said thread means to beyond said socket distal end, and said socket distal end,
   (g) said coating of said fluid passageway chamber forming a fluid passageway having a smooth constant taper outwardly from said baffle toward said fluid passageway chamber distal end.

2. A fitting as in claim 1 and wherein:
   (a) said thread mean has a diameter greater than the diameter of the portion of said body member therebelow thereby forming a shoulder between said threads and said body member, and
   (b) said insulating coating having a thickness substantially equal to the thickness of said shoulder.

3. A fitting as in claim 2 and wherein:
   (a) said body member includes a pair of said openings in said wall adjacent said baffle opening into said fluid passageway chamber and substantially diametrically opposed, and
   (b) said insulating coating covering both of said openings.

4. A fitting as in claim 3 and wherein:
   (a) said insulating coating is a continuous homogeneous coating.

5. A fitting as in claim 4 and wherein:
   (a) said insulating coating is a synthetic resinous coating.

6. A fitting as in claim 5 and wherein:
   (a) said insulating coating covering said baffle is convex toward said fluid passageway chamber.

7. A fitting as in claim 6 and wherein:
   (a) said baffle is concave toward said socket.

8. A fitting as in claim 3 and wherein:
   (a) said fluid passageway chamber has a length at least twice as great as the length of said socket.

9. A fitting as in claim 1 and wherein:
   (a) said body member comprises a nipple member and a depending tubular member, and
   (b) said depending tubular member threadedly engages said nipple member.

10. A fitting as in claim 9 and wherein:
    (a) said baffle is positioned in said depending tubular member.

11. A fitting as in claim 10 and wherein:
    (a) said wall opening is formed in said depending tubular member.

12. A fitting as in claim 10 and wherein:
    (a) said wall opening is formed in said nipple member.

13. A fitting as in claim 11 and wherein:
    (a) said depending tubular member extends through said nipple member substantially the entire length thereof.

14. A fitting as in claim 9 and wherein:
(a) said nipple member and said depending tubular member are each formed of different metals.
15. A fitting as in claim 1 and wherein:
(a) said coating on said outside wall of said body member extends axially beyond said coating on said socket distal end, thereby forming an annular shoulder having an inside diameter greater than the inside diameter of said socket.
16. A fitting as in claim 1 and wherein:
(a) said at least one annular stepped portion is positioned immediately adjacent said fluid passageway chamber distal end.
17. A fitting as in claim 16 and including:
(a) a second annular stepped portion between said baffle and said fluid passageway chamber distal end.

References Cited
UNITED STATES PATENTS

| | | | |
|---|---|---|---|
| 3,542,663 | 11/1970 | Alewitz | 204—197 |
| 2,486,936 | 11/1949 | Fergus | 204—197 |
| 3,125,360 | 3/1964 | Alrich | 285—190 X |
| 3,394,953 | 7/1968 | Landon | 138—145 X |

HERBERT F. ROSS, Primary Examiner

U.S. Cl. X.R.

204—197; 138—178